US006904750B2

(12) United States Patent
Venkataramani et al.

(10) Patent No.: US 6,904,750 B2
(45) Date of Patent: Jun. 14, 2005

(54) INTEGRAL PULSE DETONATION SYSTEM FOR A GAS TURBINE ENGINE

(75) Inventors: Kattalaicheri Srinivasan Venkataramani, West Chester, OH (US); Lawrence Butler, Cincinnati, OH (US); Ching Pang Lee, Cincinnati, OH (US); Harvey Michael Maclin, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 192 days.

(21) Appl. No.: 10/418,859

(22) Filed: Apr. 18, 2003

(65) Prior Publication Data

US 2004/0206089 A1 Oct. 21, 2004

(51) Int. Cl.⁷ ................................................ F02C 5/04
(52) U.S. Cl. ..................... 60/226.1; 60/39.34; 60/39.76
(58) Field of Search .............................. 60/776, 39.34, 60/39.76, 226.1, 247

(56) References Cited

U.S. PATENT DOCUMENTS

| | | | | |
|---|---|---|---|---|
| 2,942,412 A | * | 6/1960 | Bollay ........................ 60/247 |
| 3,089,307 A | * | 5/1963 | Kollander ................... 60/39.34 |
| 3,240,010 A | * | 3/1966 | Morrison et al. ............. 60/213 |
| 5,138,831 A | * | 8/1992 | Cowan, Sr. ................ 60/39.34 |
| 5,345,758 A | | 9/1994 | Bussing ...................... 60/39.38 |
| 5,901,550 A | | 5/1999 | Bussing et al. ............. 60/39.38 |
| 6,349,538 B1 | | 2/2002 | Hunter, Jr. et al. ........... 60/204 |
| 6,505,462 B2 | | 1/2003 | Meholic ..................... 60/39.39 |

* cited by examiner

*Primary Examiner*—Ehud Gartenberg
(74) *Attorney, Agent, or Firm*—William Scott Andes; James P. Davidson

(57) ABSTRACT

A pulse detonation system for a gas turbine engine having a longitudinal centerline axis extending therethrough includes a rotatable cylindrical member having a forward surface, an aft surface, and an outer circumferential surface, where at least one stage of spaced detonation passages are disposed therethrough. The pulse detonation system further includes a shaft rotatably connected to the cylindrical member and a stator configured in spaced arrangement with the forward surface of the cylindrical member and a portion of the shaft. The stator has at least one group of ports formed therein alignable with the detonation passages as the cylindrical member rotates. In this way, detonation cycles are performed in the detonation passages so that combustion gases exit the cylindrical manner in a substantially tangential direction with respect to the outer circumferential surface to create a torque which causes the cylindrical member to rotate. Each detonation passage includes a first portion extending from the cylindrical member forward surface to a middle portion of the cylindrical member and a second portion extending from the first portion to the outer circumferential surface of the cylindrical member.

43 Claims, 9 Drawing Sheets

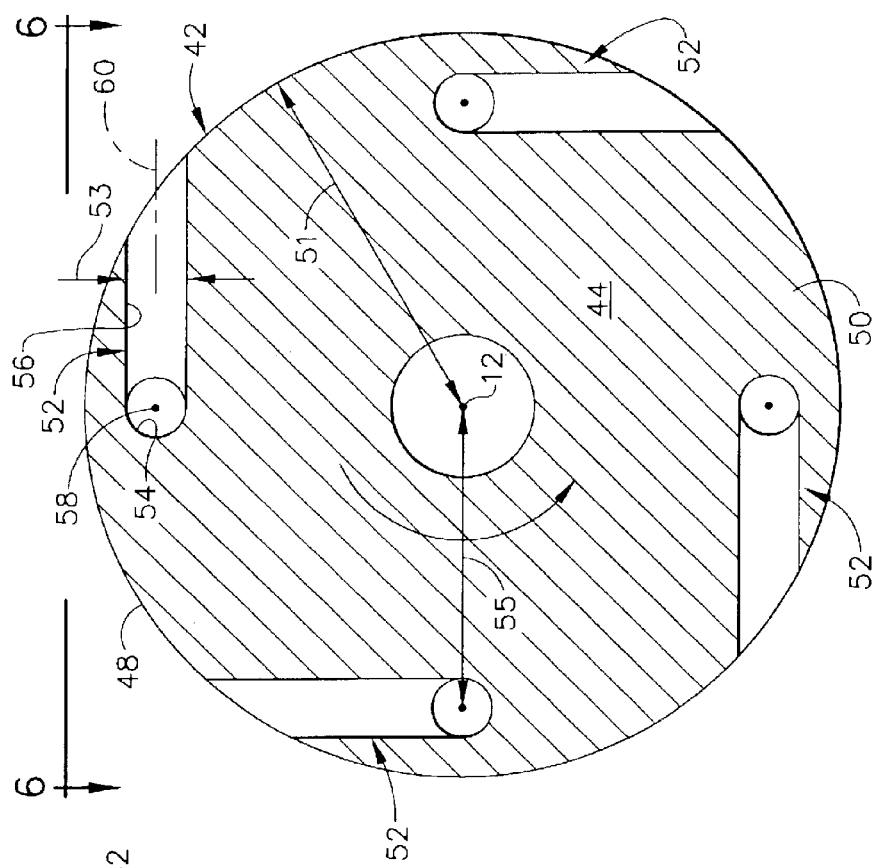
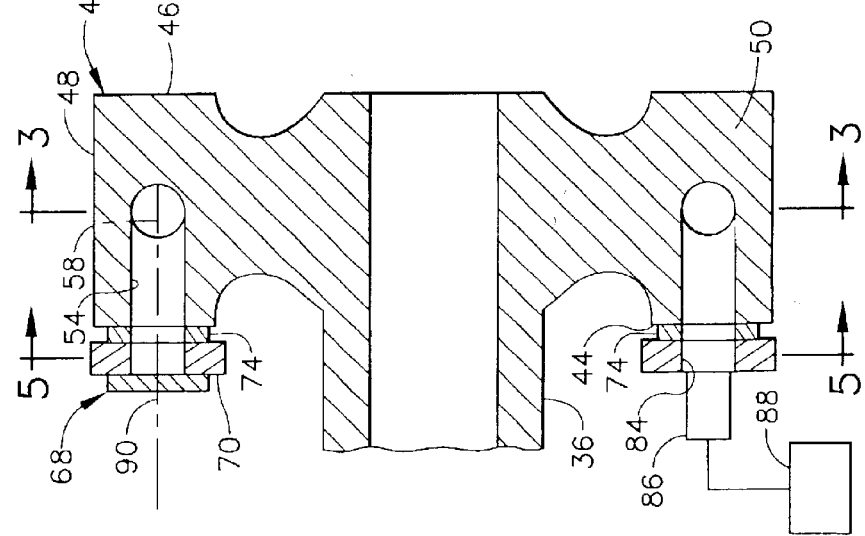

INTEGRAL PULSE DETONATION SYSTEM FOR A GAS TURBINE ENGINE

BACKGROUND OF THE INVENTION

The present invention relates generally to a pulse detonation system for a gas turbine engine and, in particular, to a pulse detonation system which is able to replace the core of a gas turbine engine without use of an externally actuated valve system.

It is well known that typical gas turbine engines are based on the Brayton Cycle, where air is compressed adiabatically, heat is added at constant pressure, the resulting hot gas is expanded in a turbine, and heat is rejected at constant pressure. The energy above that required to drive the compression system is then available for propulsion or other work. Such gas turbine engines generally rely upon deflagrative combustion to burn a fuel/air mixture and produce combustion gas products which travel at relatively slow rates and constant pressure within a combustion chamber. While engines based on the Brayton Cycle have reached a high level of thermodynamic efficiency by steady improvements in component efficiencies and increases in pressure ratio and peak temperature, further improvements are becoming increasingly costly to obtain.

Accordingly, improvements in engine efficiency have been obtained by operating the engine so that the combustion occurs as a detonation in either a continuous or pulsed mode. Most pulse detonation devices employ detonation tubes that are fed with a fuel/air mixture that is subsequently ignited. A combustion pressure wave is then produced, which transitions into a detonation wave (i.e., a fast moving shock wave closely coupled to the reaction zone). The products of combustion follow the detonation wave and are propagated at the speed of sound relative to the detonation wave while simultaneously providing a significant pressure rise. Such combustion products then exit through a nozzle to produce thrust. Examples of a pulse detonation engine are disclosed in U.S. Pat. No. 5,345,758 to Bussing and U.S. Pat. No. 5,901,550 to Bussing et al.

Simple pulse detonation engines have no moving parts with the exception of various forms of externally actuated valves. Such valves are used to control the duration of the fuel/air introduction and to prevent backflow of combustion products during the detonation process. An example of a rotary valve utilized for pulse detonation engines is disclosed in U.S. Pat. No. 6,505,462 to Meholic. While such pulse detonation configurations have advanced the state of the art, the valves and associated actuators are subjected to very high temperatures and pressures. This not only presents a reliability problem, but can also have a detrimental effect on the turbomachinery of the engine.

One type of pulse detonation system which has eliminated the need for a separate valve is disclosed in a patent application entitled "Pulse Detonation Device For A Gas Turbine Engine," having Ser. No. 10/905,561 and being owned by the assignee of the present invention. It will be noted therein that the pulse detonation device includes a stationary air inlet duct and a ring member which rotates therearound. The various events of the detonation take place within detonation ducts associated with the ring member, as air and fuel are injected and a detonation wave is initiated therein. In this configuration, the aft portion of the rotatable ring member is connected to a drive shaft in a cantilevered manner. The air ports, fuel injectors and initiation devices are located adjacent an outer surface of the air inlet duct so as to be sequentially aligned with an inner end of the detonation ducts, which are open at each end, as the ring member rotates.

A second type of pulse detonation system is disclosed in a patent application entitled "Pulse Detonation System For A Gas Turbine Engine," having Ser. No. 10/383,027 and being owned by the assignee of the present invention. It will be seen therein that the pulse detonation system includes a rotatable cylindrical member having a plurality of spaced detonation chambers disposed therein. A stator is configured in spaced arrangement around the forward surface, the aft surface, and the outer circumferential surface of the cylindrical member and a drive shaft connected thereto. The stator has a group of ports formed therein which are in flow communication with the detonation chambers from a position adjacent the outer circumferential surface of the cylindrical member. Detonation cycles are performed in the detonation chambers so that reaction forces induced by the detonation cycles create a torque which causes the cylindrical member to rotate. Each detonation chamber includes a first open end located adjacent the outer circumferential surface of the cylindrical member and a second closed end located within a middle portion of the cylindrical member.

Accordingly, it would be desirable for a pulse detonation system to be developed for a gas turbine engine which is able to operate the engine without the need for a separate valve and without causing adverse effects on the other components of the gas turbine engine. Further, it would be desirable for such pulse detonation system to be adaptable to a gas turbine engine for both aeronautical and industrial applications so as to eliminate the core (i.e., a high pressure compressor, combustor, and high pressure turbine). It is also desirable that the pulse detonation system include a cylindrical member which is better able to sustain the centrifugal load and high pressures generated during the detonation process.

BRIEF SUMMARY OF THE INVENTION

In a first exemplary embodiment of the invention, a pulse detonation system for a gas turbine engine is disclosed as having a longitudinal centerline axis extending therethrough. The pulse detonation system includes a rotatable cylindrical member having a forward surface, an aft surface, and an outer circumferential surface, where at least one stage of spaced detonation passages are disposed therethrough. A shaft is rotatably connected to the cylindrical member and a stator is configured in spaced arrangement with the forward surface of the cylindrical member and a portion of the shaft. The stator further includes at least one group of ports formed therein alignable with the detonation passages as the cylindrical member rotates. In this way, detonation cycles are performed in the detonation passages so that combustion gases exit the cylindrical member in a substantially tangential direction with respect to the outer circumferential surface to create a torque which causes the cylindrical member to rotate. Each detonation passage further includes a first portion extending from the cylindrical member forward surface to a middle portion of the cylindrical member and a second portion extending from the first portion to the outer circumferential surface of the cylindrical member.

In a second exemplary embodiment of the invention, a method of providing power to a drive shaft in a gas turbine engine is disclosed as including the following steps: providing a rotatable cylindrical member having a plurality of spaced detonation passages therein; providing a stator in spaced relation to a forward surface of the cylindrical member, where the stator has at least one group of ports formed therein; connecting the cylindrical member to a drive shaft; performing a detonation cycle in each detonation passage; and, producing a torque on the cylindrical member which causes the cylindrical member and the drive shaft to rotate. The detonation cycle further includes the steps of supplying compressed air to the detonation passages, injecting fuel into the detonation passages, initiating a detonation wave in the detonation passages, and exhausting products of combustion from the cylindrical member in a substantially tangential direction with respect to an outer circumferential surface thereof. The method may also include the step of causing the cylindrical member to rotate at a predetermined speed prior to injecting fuel into the detonation passages.

In accordance with a third embodiment of the invention, a gas turbine engine is disclosed as including: a fan section at a forward end of the gas turbine engine including at least a first fan blade row connected to a drive shaft; a booster compressor positioned downstream of the fan section, where the booster compressor includes a first compressor blade row and a second compressor blade row connected to the drive shaft and interdigitated with the first compressor blade row; and, a pulse detonation system for powering the drive shaft. The pulse detonation system further includes a rotatable cylindrical member having a forward surface, an aft surface, and an outer circumferential surface, where the cylindrical member has at least one stage of spaced detonation passages disposed therethrough and the cylindrical member is connected to the drive shaft. A stator is also configured in spaced arrangement with the forward surface of the cylindrical member and a portion of the shaft, with the stator including at least one group of ports formed therein alignable with the detonation passages as the cylindrical member rotates. In this way, detonation cycles are performed in the detonation passages so that combustion gases exit the cylindrical member in a substantially tangential direction with respect to the outer circumferential surface to create a torque which causes the cylindrical member to rotate and power the fan section and the booster compressor. Each group of ports in the stator further includes an air port in flow communication with a source of compressed air, a fuel port in flow communication with a fuel source, and a port having a device associated therewith for initiating a detonation in the detonation passages.

In accordance with a fourth embodiment of the present invention, a gas turbine engine is disclosed as including: a bellmouth at a forward end of the gas turbine engine; a compressor positioned downstream of and in flow communication with the bellmouth, the compressor including a first compressor blade row and a second blade row connected to a drive shaft and interdigitated with the first compressor blade row; a load connected to the drive shaft; and, a pulse detonation system for powering the drive shaft. The pulse detonation system further includes a rotatable cylindrical member having a forward surface, an aft surface, and an outer circumferential surface, where the cylindrical member has at least one stage of spaced detonation passages disposed therethrough and is connected to the drive shaft. A stator is configured in spaced arrangement to the forward surface of the cylindrical member and a portion of the shaft, with the stator including at least one group of ports formed therein alignable with the detonation passages as the cylindrical member rotates. In this way, detonation cycles are performed in the detonation passages so that combustion gases exit the cylindrical member in a substantially tangential direction with respect to the outer circumferential surface to create a torque which causes the cylindrical member to rotate and power the compressor and the load. Each group of ports in the stator further includes an air port in flow communication with a source of compressed air, a fuel port in flow communication with a fuel source, and a port having a device associated therewith for initiating a detonation in the detonation passages.

BRIEF DESCRIPTION OF THE DRAWINGS

FIG. 2 is an enlarged, partial longitudinal schematic sectional view of the gas turbine engine depicted in FIG. 1, wherein the pulse detonation system is shown in greater detail;

FIG. 3 is a schematic sectional view of the pulse detonation system taken along lines 3—3 in FIG. 2;

DETAILED DESCRIPTION OF THE INVENTION

Figure 1:
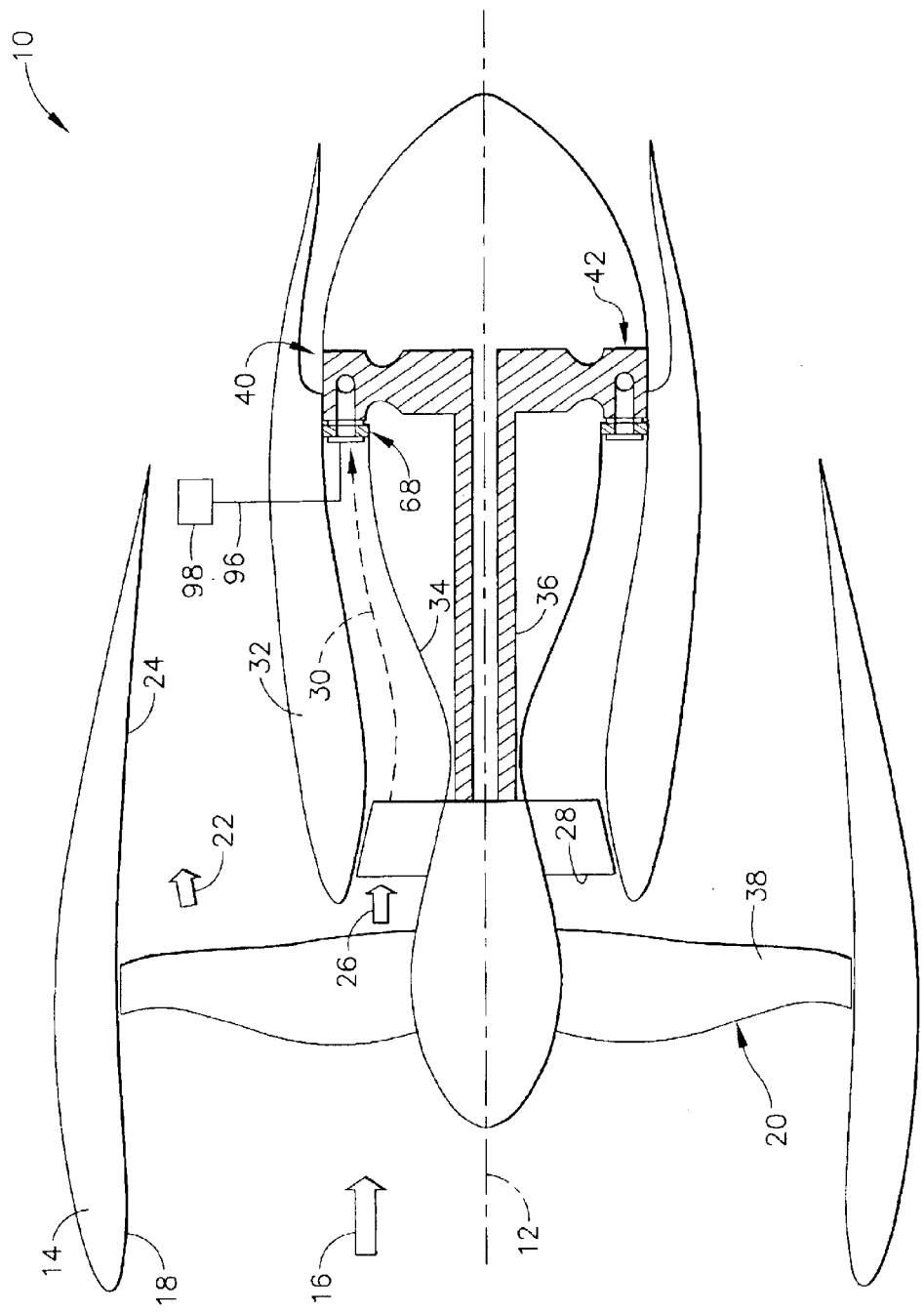
FIG. 1 is a longitudinal schematic sectional view of a first gas turbine engine configuration including a pulse detonation system in accordance with the present invention.

Referring now to the drawings in detail, wherein identical numerals indicate the same elements throughout the figures, FIG. 1 schematically depicts an exemplary gas turbine engine 10 (high bypass type) utilized with aircraft having a longitudinal or axial centerline axis 12 therethrough for reference purposes. Gas turbine engine 10 includes a nacelle 14 to assist in directing a flow of air (represented by arrow 16) through an inlet 18 to a fan section 20 as is well known. Air flow 16 is then split downstream of fan section 20 so that a first portion (represented by arrow 22) flows through an outer duct 24 and a second portion (represented by arrow 26) is provided to a booster compressor 28.

In the high bypass configuration depicted, it will be understood that booster compressor 28 preferably provides a compressed air flow 30 which is bounded by an inner bypass platform 32 and a gooseneck inner flow path 34. It will be noted that booster compressor 28 preferably includes at least one compressor stage with a stationary compressor blade row and a compressor blade row connected to a drive shaft 36 and interdigitated with the stationary compressor blade row associated with each compressor stage. It will be appreciated that additional booster compressor stages may be provided as desired. A first fan blade row 38 is also preferably connected to drive shaft 36.

Drive shaft 36 is preferably powered by means of a pulse detonation system 40 in accordance with the present invention. More specifically, pulse detonation system 40 includes a rotatable cylindrical member 42 having a forward surface 44, an aft surface 46, an outer circumferential surface 48 and a middle portion 50 having a radius 51. Cylindrical member 42 further includes a plurality of detonation passages 52 disposed therethrough. Each detonation passage 52 is preferably formed to include a first portion 54 extending from forward surface 44 of cylindrical member 42 into middle portion 50 and a second portion 56 extending from first portion 54 to outer circumferential surface 48 of cylindrical member 42.

Each detonation passage 52 preferably has a substantially circular cross-section throughout the length of at least a portion thereof, although such cross-section may also be non-circular. Detonation passages 52 also preferably have a substantially constant diameter 53, although they may include a substantially convergent diameter for a portion thereof. Further, first portion 54 of each detonation passage 52 is preferably substantially linear and has a longitudinal axis 58 extending therethrough substantially parallel to longitudinal centerline axis 12. It will be noted that first portions 54 of detonation passages 52 are preferably arranged in a substantially annular fashion with respect to forward surface 44 of cylindrical member 42, where such first detonation passage portions 54 are positioned substantially in an annulus having a first radius 55.

Figure 7:
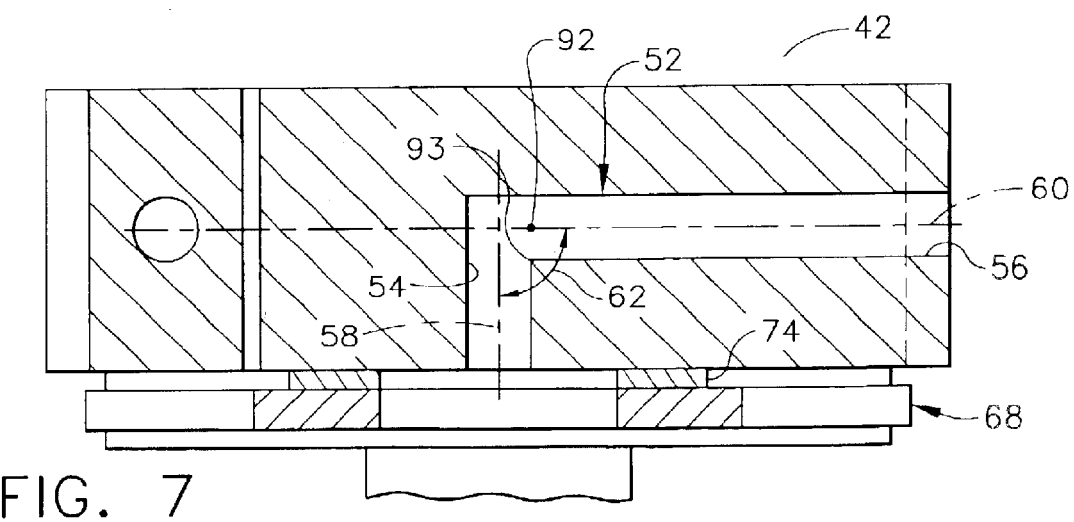
FIG. 7 is a schematic sectional view of the pulse detonation system taken along lines 7—7 in FIG. 4.

Second portion 56 of detonation passages 52 is also preferably substantially linear and includes a longitudinal axis 60 extending therethrough at an angle 62 to longitudinal axis 58 of first portion 54. As seen in FIG. 7, angle 62 is preferably substantially 90° so that longitudinal axes 58 and 60 are substantially perpendicular. In order to assist in turning the flow exiting from detonation passages 52 downstream, angle 62 between longitudinal axes 58 and 60 may be obtuse (see FIG. 8) so as to have a partially axial discharge. It will be appreciated that in such case angle 62 is preferably in a range of approximately 90–135°. In yet another configuration of detonation passages 52, FIG. 9 depicts second portion 56 as being oriented substantially perpendicular to first portion 54 and non-linear. Regardless of which configuration detonation passages 52 take, it will be noted that second portion 56 thereof preferably extends substantially tangentially to outer circumferential surface 48 of cylindrical member 42.

It is further preferred that detonation passages 52 be symmetrically spaced circumferentially within cylindrical member 42. The number of detonation passages 52 provided within cylindrical member 42 is dependent upon several factors, including the length of each detonation passage 52 and radius 51 of cylindrical member 42.

Figure 4:
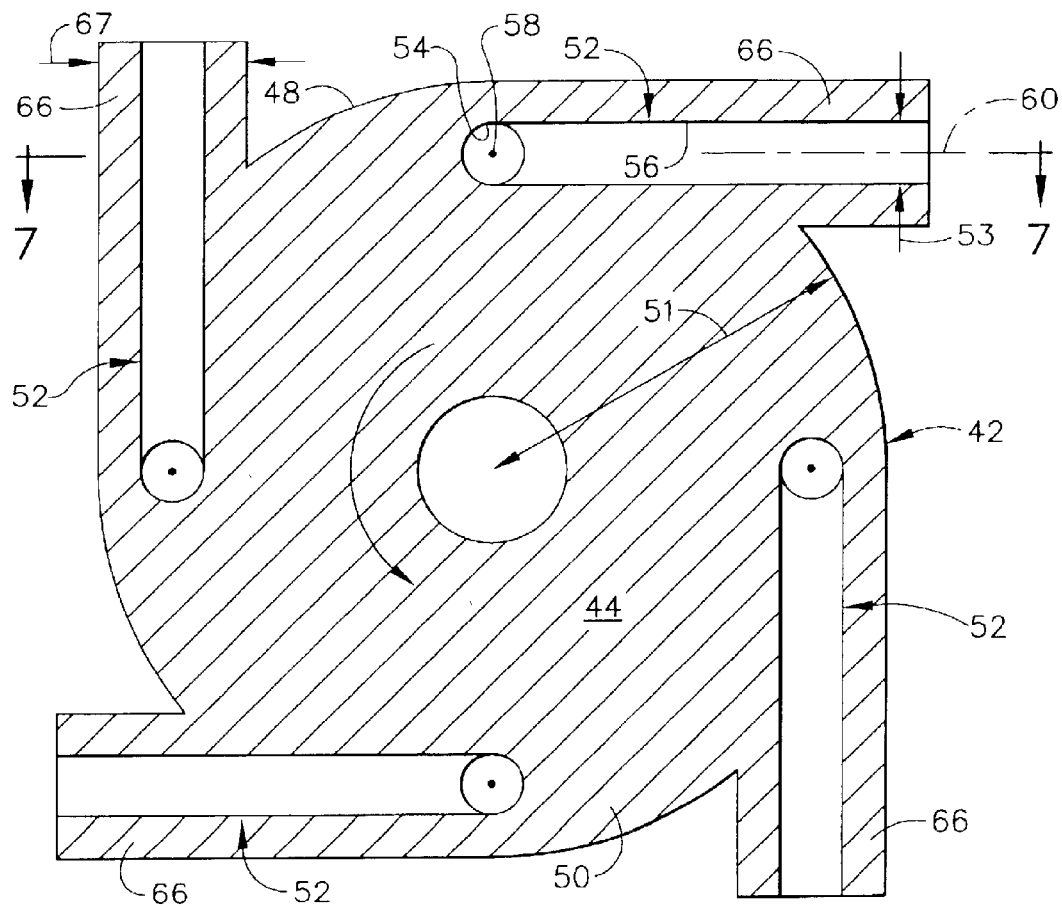
FIG. 4 is a schematic sectional view of the pulse detonation system similar to FIG. 3 depicting an alternative configuration for the cylindrical member.
Figure 6:
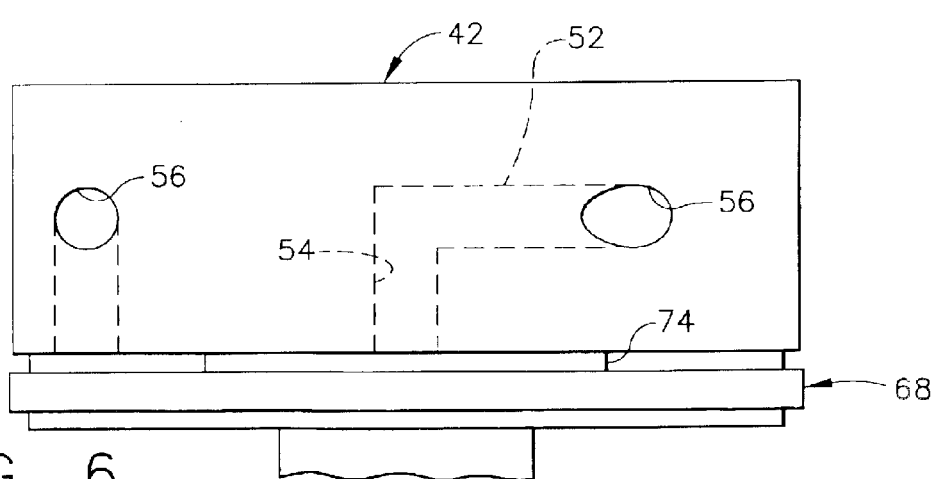
FIG. 6 is a top sectional view of the pulse detonation system taken along lines 6—6 in FIG. 3.

While cylindrical member 42 preferably maintains a uniform outer circumferential surface 48 as seen in FIG. 3, it is also contemplated that the length of such second detonation passage portions 56 could be increased to enhance the detonation cycle therein. Accordingly, FIG. 4 depicts cylindrical member 42 as having an alternative configuration where certain portions 66 extend substantially tangentially from outer circumferential surface 48 and have a thickness 67. It will be understood that second portions 56 then extend through such extending portions 66 to increase the length thereof.

Pulse detonation system 40 further includes a stator 68 which is configured in spaced arrangement with respect to forward surface 44 of cylindrical member 42, as well as a portion of drive shaft 36. It will be seen that stator 68 is substantially annular and preferably includes a plurality of seals 74 circumferentially spaced and positioned between forward surface 44 of cylindrical member 42 and a rear surface 70 thereof so as to prevent flow between ports.

Stator 68 further includes at least one group of ports 78 formed therein. It will be understood that each port group 78 has an air port 80 in flow communication with a source of compressed air (e.g., first compressed air flow 30 from booster compressor 28), a fuel port 82 in flow communication with a fuel source, and a port 84 having a device 86 associated therewith for initiating a detonation in detonation passages 52. It is contemplated that exemplary initiation devices 86 may include an igniter (e.g., a high energy spark plug, a torch igniter having separate fuel and oxidizer, or a plasma jet igniter), a laser, or a shock focus device. Initiation device 86 may be activated when in alignment with each detonation passage 52 so as to assist in producing a detonation wave in all detonation passages 52 or in accordance with a predetermined delay so that only certain detonation passages 52 are utilized for this purpose. A control device 88 is preferably provided to control the initiation of detonations within detonation passages 52.

It will be seen that air port 80, fuel port 82 and initiation port 84 of each port group 78 are preferably oriented in stator 68 in the same manner as detonation passage first portion 52 is in cylindrical member 42 described hereinabove so that they are alignable with each detonation passage 52 in a predetermined timing and sequence as cylindrical member 42 rotates. Thus, a longitudinal axis 90 through such ports is likewise substantially parallel to longitudinal centerline axis 12. In this way, detonation cycles are able to be performed in detonation passages 52 so that combustion gases follow detonation waves through detonation passages 52 during such detonation cycles in a substantially tangential direction with respect to outer circumferential surface 48 to create a torque that causes cylindrical member 42 to rotate.

Figure 5:
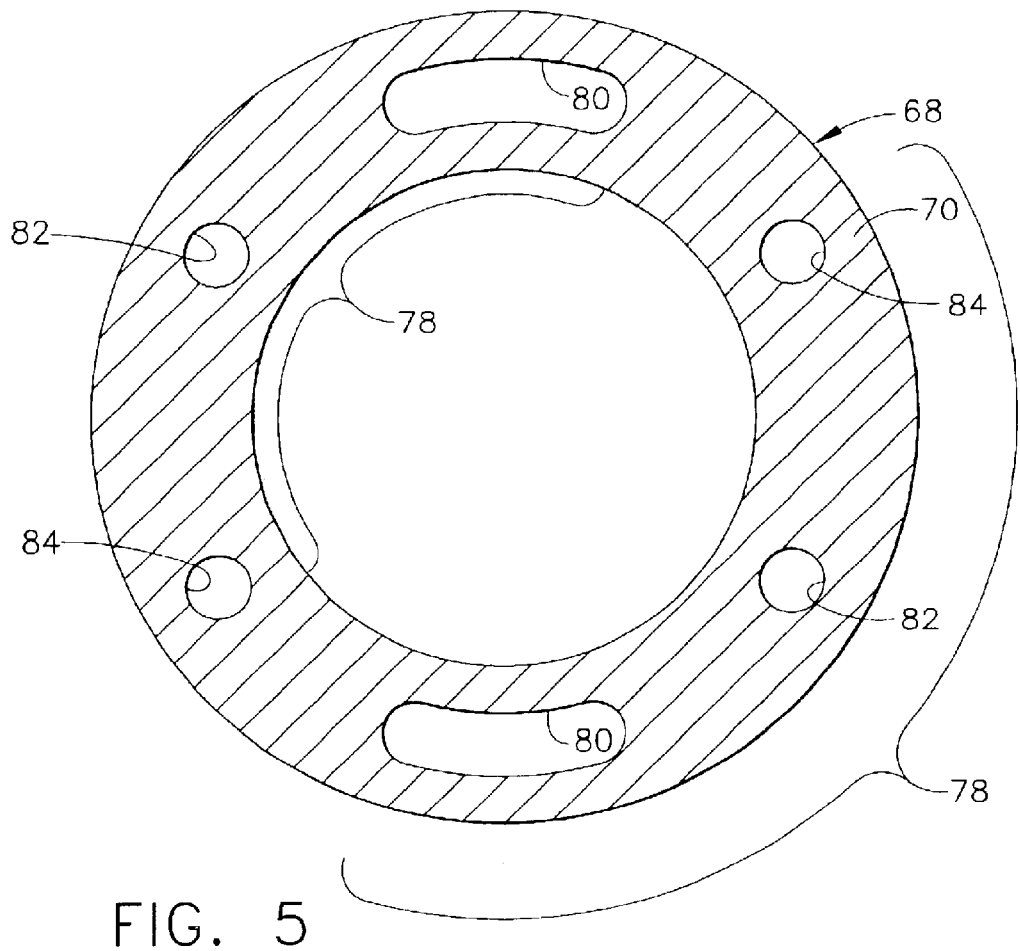
FIG. 5 is a schematic sectional view of the pulse detonation system taken along line 5—5 in FIG. 2.

As seen in FIG. 5, each air port 80 is preferably configured so as to extend annularly in a substantially elliptical manner. In this way, the length of time in which such ports are aligned with detonation passages 52 is increased. This is of particular importance for air ports 80 since the compressed air supplied therethrough functions to exhaust any remaining combustion products in detonation passages 52. In addition, compressed air provided via air ports 80 is preferably utilized to generate a predetermined rotational speed for cylindrical member 42 prior to any detonation cycle.

Figure 10:
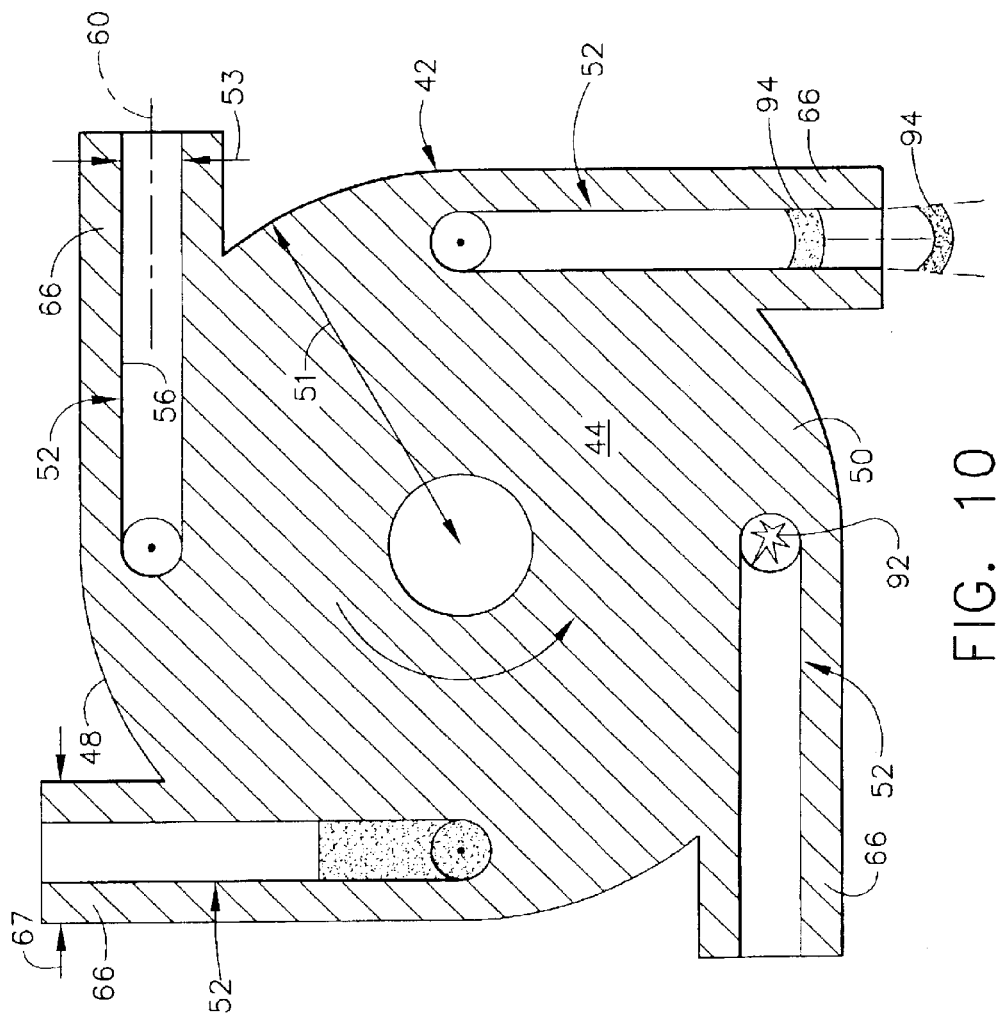
FIG. 10 is a schematic sectional view of the pulse detonation system as depicted in FIG. 4, where a detonation passage is shown as undergoing a specified sequence of events in a detonation cycle.
Figure 12:
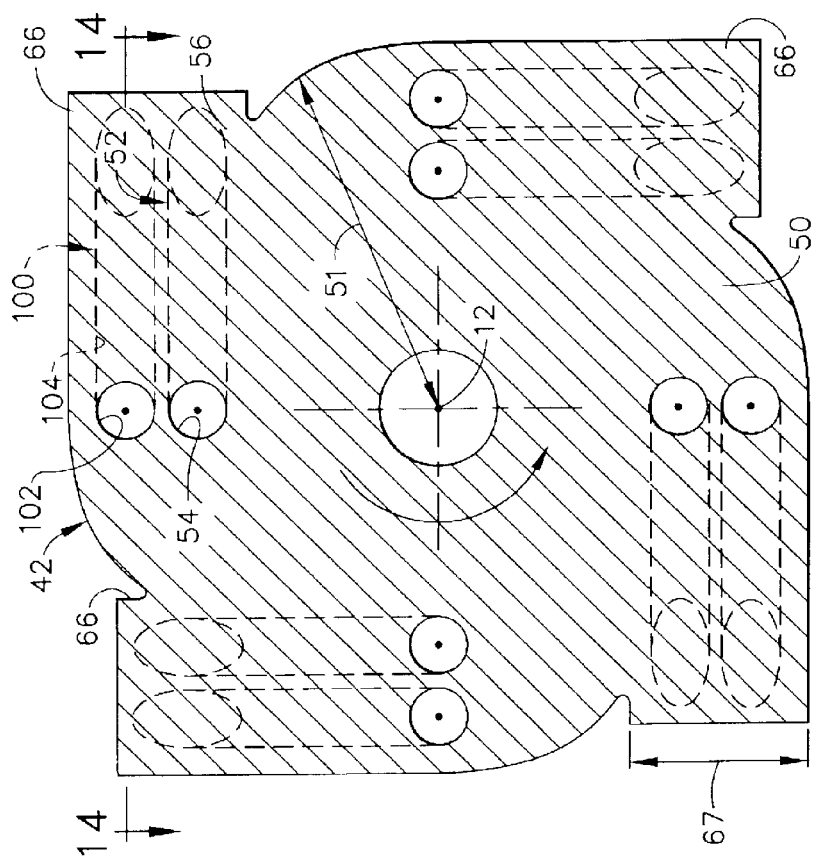
FIG. 12 is a schematic sectional view of the pulse detonation system taken along lines 12—12 in FIG. 11.

With respect to the detonation cycle performed in each detonation passage 52, FIG. 10 represents a preferred sequence of events which takes place according to a predetermined timing. It will be understood from the upper right portion of FIG. 10 that detonation passage 52 is preferably filled with compressed air from air port 80, which also serves to purge remaining combustion products from the previous detonation cycle. Next, the upper left portion of FIG. 10 depicts the injection of fuel in detonation passage 52 via fuel port 82. As seen in the lower left portion of FIG. 10, device 86 preferably initiates detonation of the fuel/air mixture in detonation passage 52 at an initiation point 92 so that a detonation wave 94 is formed. It will be appreciated that initiation point 92 is preferably located at an upstream end 93 of second detonation passage portion 56 (see FIG. 7). Detonation wave 94 then travels through second portion 56 of detonation passage 52 as seen in the lower right portion of FIG. 10, whereby combustion gases follow detonation wave 94 out detonation passage 52 and are exhausted in a substantially tangential direction with respect to outer circumferential surface 48 to create a torque which causes cylindrical member 42 to rotate.

It will be appreciated that prior to the occurrence of any detonation cycles within detonation passages 52, cylindrical member 42 is preferably driven so as to obtain a predetermined rotational speed. This is caused by supplying compressed air to detonation passages 52 via air ports 80 at a relatively higher pressure than the pressure at which air is discharged from detonation passages 52. Once the predetermined rotational speed of cylindrical member 42 is achieved, fuel is then supplied to detonation passages 52 in accordance with the detonation cycle described hereinabove.

It will be understood that a plurality of port groups 78 may be provided in stator 68, wherein a plurality of detonation cycles are able to occur in each detonation passage 52 during a revolution of cylindrical member 42. Such port groups 78 are preferably spaced symmetrically around stator 68, although it is not required. Moreover, while the number of port groups 78 may be equivalent to the number of detonation passages 52 provided in cylindrical member 42, there may be less. In any event, a predetermined amount of circumferential space is provided between each port group 78, as well as between each individual port thereof.

Another aspect of pulse detonation system 40 is the manner in which fuel is supplied to fuel ports 82 for injection into detonation passages 52. In one embodiment, a fuel manifold 96 is provided upstream of stator 68 (see FIG. 1). Fuel manifold 96 is preferably in flow communication with a fuel supply (not shown) at one end and in flow communication with fuel ports 82 at a second end so that fuel is supplied thereto as part of the detonation cycle in detonation passages 52 described herein. A device 98 is provided to control the injection of fuel from fuel manifold 96.

Figure 11:
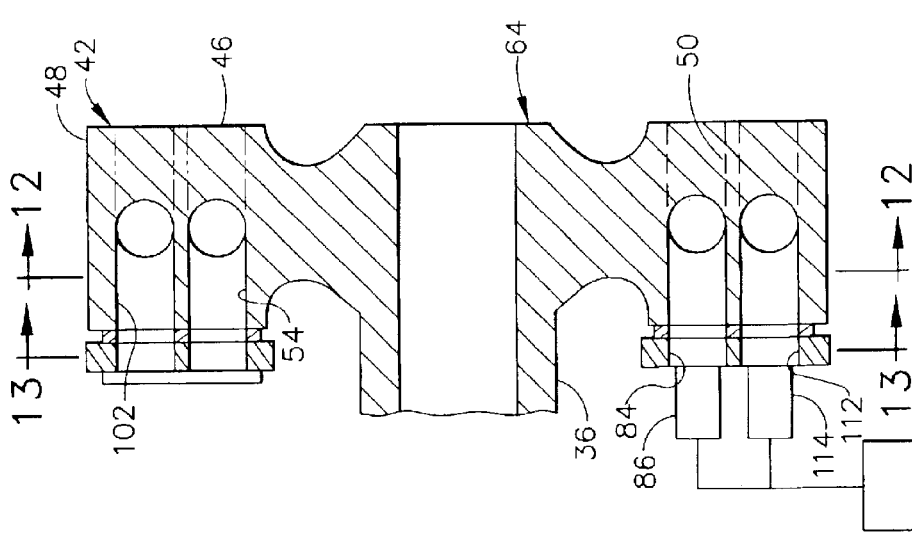
FIG. 11 is an enlarged, partial longitudinal schematic sectional view of the gas turbine engine depicted in FIG. 1, wherein a pulse detonation system having an alternative configuration is shown in greater detail.

FIG. 11 depicts an alternative embodiment for pulse detonation system 40, where an additional stage of spaced detonation passages 100 are disposed therethrough. Detonation passages 100 are preferably positioned radially adjacent to detonation passages 52 and may be located radially interior and/or exterior thereto. It will be appreciated that such detonation passages 100 are configured in a manner similar to detonation passages 52. Thus, each detonation passage 100 likewise is preferably formed to include a first portion 102 extending from forward surface 44 of cylindrical member 42 into middle portion 50 and a second portion 104 extending from first portion 102 to outer circumferential surface 48 of cylindrical member 42. In the case where cylindrical member 42 includes portions 66 extending from outer circumferential surface 48, thickness 67 of such extending portions 66 will preferably be increased to accommodate detonation passages 100 therethrough. Otherwise, cylindrical member 42 will require radius 51 thereof to be larger to accommodate such additional detonation passages 100.

Figure 8:
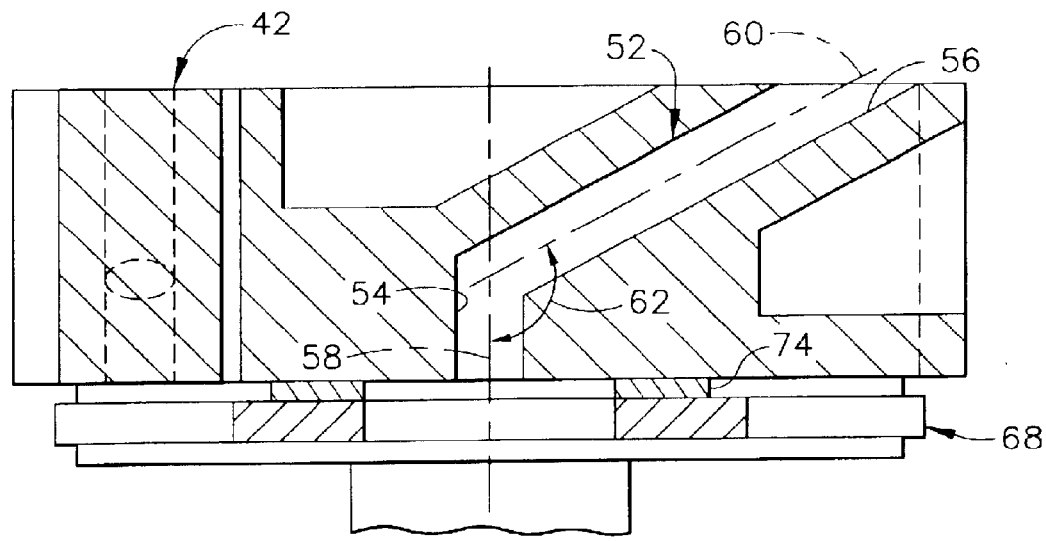
FIG. 8 is a schematic sectional view of the pulse detonation system similar to FIG. 7 depicting an alternative detonation passage configuration.
Figure 9:
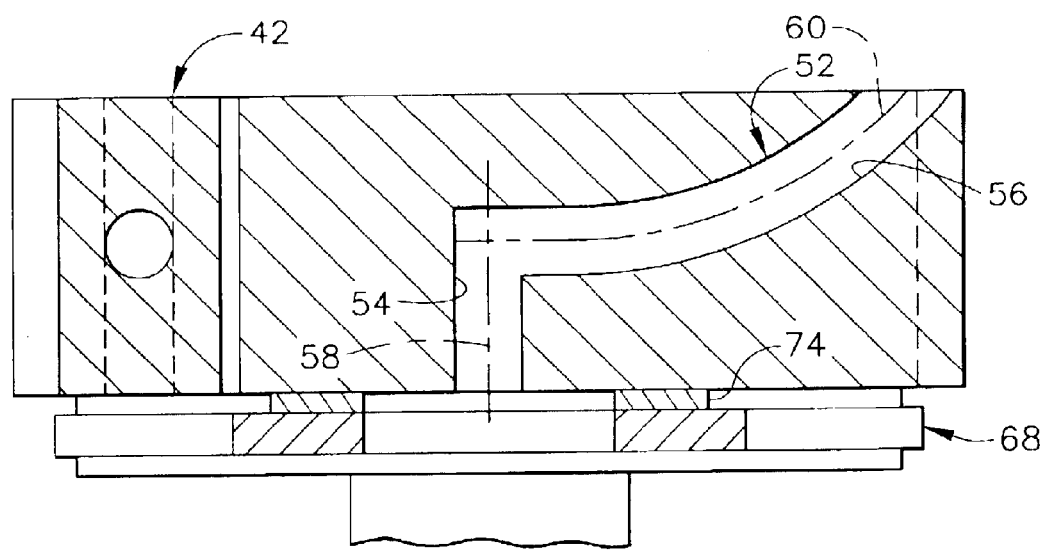
FIG. 9 is a schematic sectional view of the pulse detonation system similar to FIGS. 7 and 8 depicting a second alternative detonation passage configuration.
Figure 14:
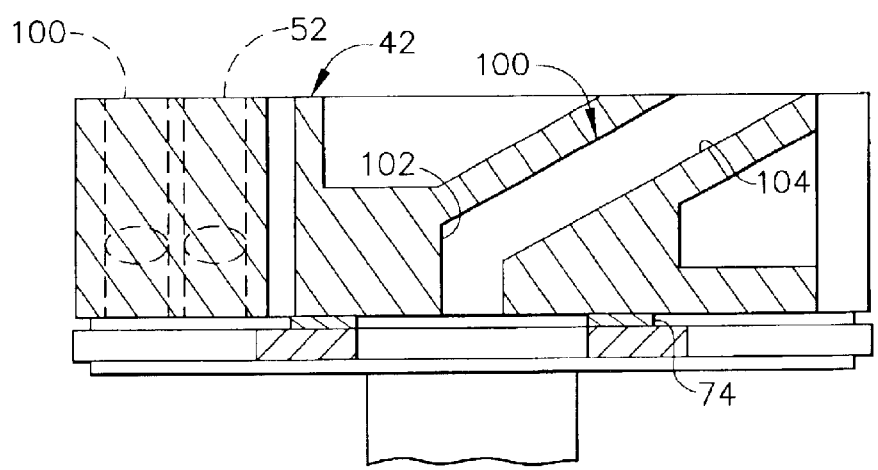
FIG. 14 is a schematic sectional view of the pulse detonation system taken along lines 14—14 in FIG. 12; and, FIG. 15 is a longitudinal schematic sectional view of a second gas turbine engine configuration including a pulse detonation system in accordance with the present invention.

It is also preferred that first and second portions 102 and 104 of detonation passages 100 be configured similar to that of detonation passages 52, whether that be as depicted in any of FIGS. 7–9 shown and described above (FIG. 14 showing a configuration like that in FIG. 8). In order to simplify construction and supplying air and fuel thereto, it is preferred that detonation passages 100 be substantially aligned circumferentially with detonation passages 52 and therefore have substantially the same circumferential spacing therebetween. Accordingly, first portions 54 and 102 of detonation passages 52 and 100, respectively, will preferably extend substantially in parallel, as will second portions 56 and 104 thereof.

Figure 13:
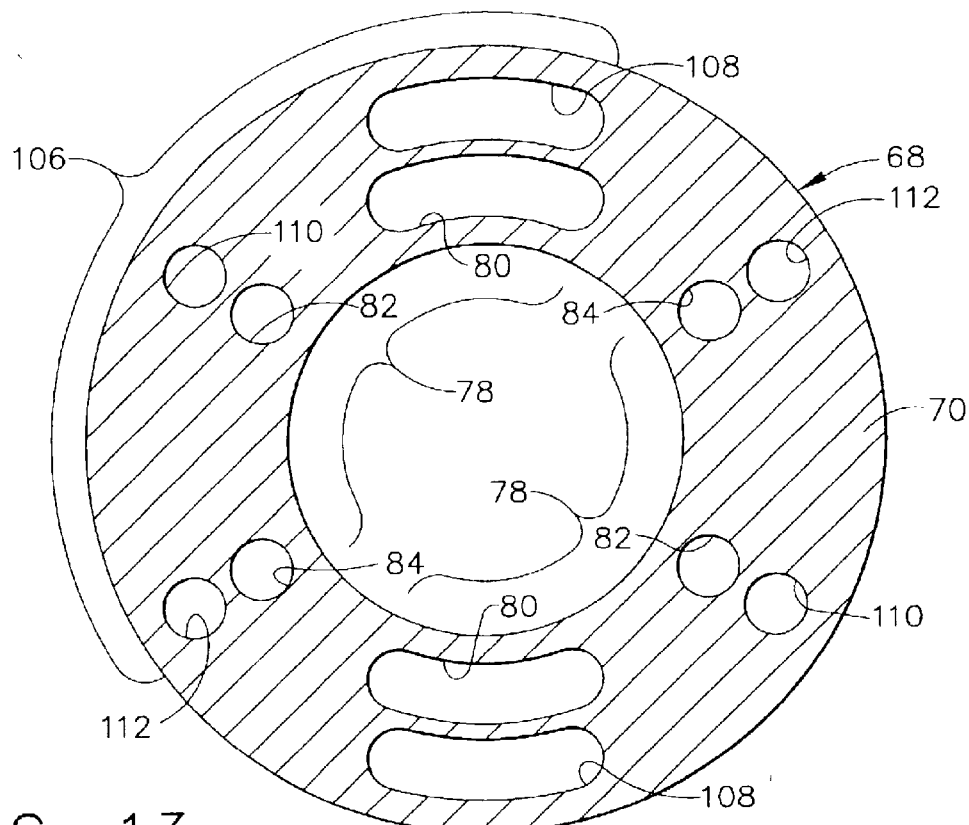
FIG. 13 is a schematic sectional view of the pulse detonation system taken along lines 13—13 in FIG. 11.

It will also be appreciated that stator 68 will preferably include at least one group of ports 106 formed therein which are positioned relative to port group 78 so as to be alignable with detonation passages 100. In this regard, FIG. 13 depicts an air port 108, a fuel port 110 and an initiation port 112 having a device 114 associated therewith for initiating a detonation in detonation passages 100. Devices 114 may also be controlled by control device 88. Of course, a plurality of circumferentially spaced port groups 106 may be formed in stator 68.

Figure 15:
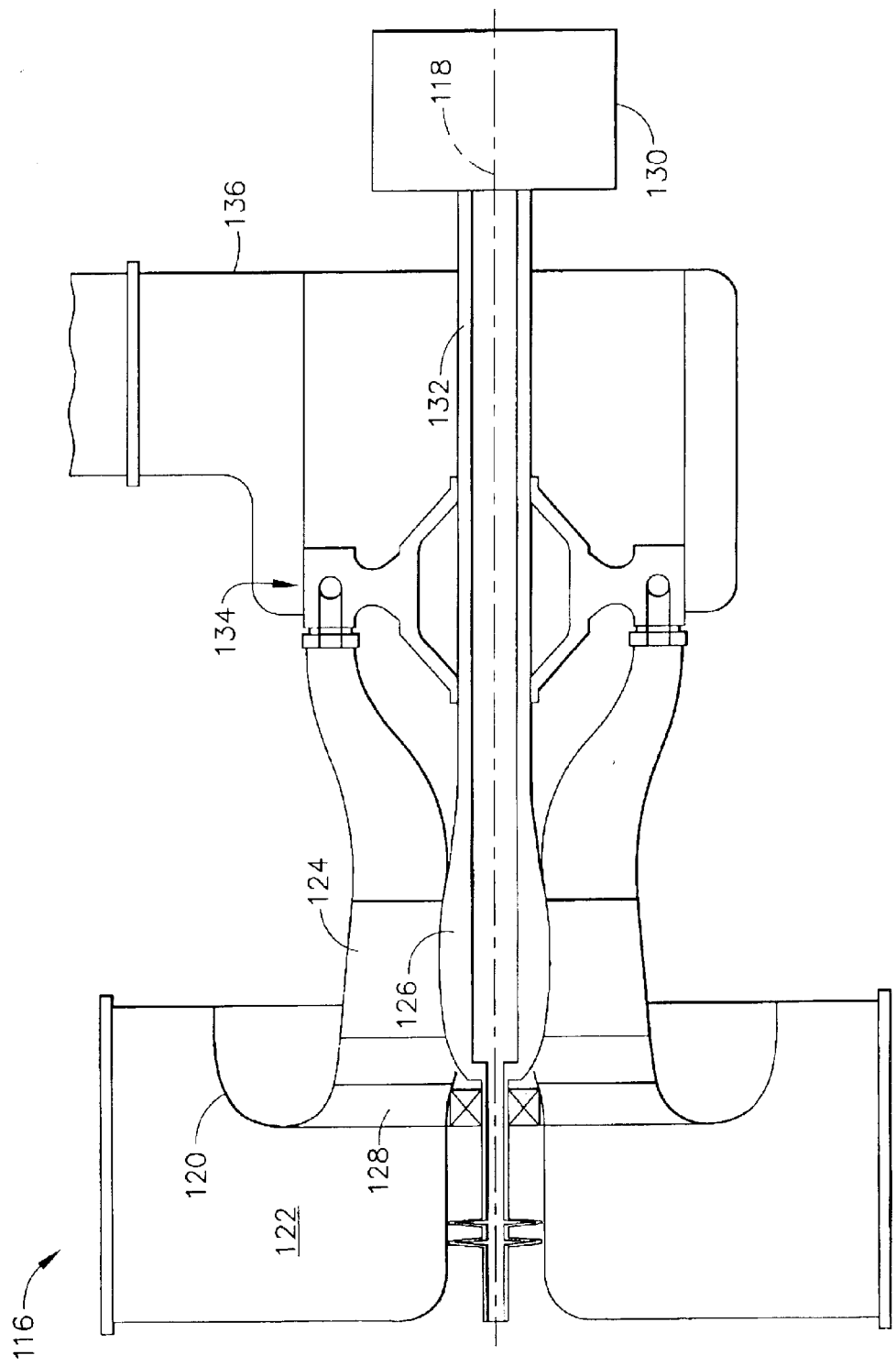

It will be seen in FIG. 15 that an alternative gas turbine engine 116 is depicted for use in industrial and other shaft power applications (e.g., marine or helicopter propulsion) as having a longitudinal centerline axis 118. As seen therein, gas turbine engine 116 includes a bellmouth 120 at an inlet 122 and a compressor 124 positioned downstream of and in flow communication with bellmouth 120. Compressor 124 preferably includes at least a first stationary compressor blade row connected to a drive shaft 126 and a second stationary compressor blade row interdigitated with first compressor blade row. Additional compressor blade rows may be connected to drive shaft 126, with additional stationary compressor blade rows interdigitated therewith. An inlet guide vane 128 may be positioned at an upstream end of compressor 124 to direct the flow of air therein. A load 130 is also connected to drive shaft 126 via a second drive shaft 132. A pulse detonation system 134 like that described hereinabove is provided for powering drive shaft 126, with an exhaust duct 136 being in flow communication with pulse detonation system 134 so that combustion gases are able to exit therefrom.

Having shown and described the preferred embodiment of the present invention, further adaptations of the pulse detonation system can be accomplished by appropriate modifications by one of ordinary skill in the art without departing from the scope of the invention. In particular, it will be understood that pulse detonation system 40 may be utilized with other types of gas turbine engines not depicted herein, such as low bypass gas turbine engines.

What is claimed is:

1. A pulse detonation system for a gas turbine engine having a longitudinal centerline axis extending therethrough, comprising:

(a) a rotatable cylindrical member having a forward surface, an aft surface, and an outer circumferential surface, said cylindrical member including at least one stage of spaced detonation passages disposed therethrough;

(b) a shaft rotatably connected to said cylindrical member; and, (c) a stator configured in spaced arrangement with said forward surface of said cylindrical member and a portion of said shaft, said stator including at least one group of ports formed therein alignable with said detonation passages as said cylindrical member rotates; wherein detonation cycles are performed in said detonation passages so that combustion gases exit said cylindrical member in a substantially tangential direction with respect to said outer circumferential surface to create a torque which causes said cylindrical member to rotate.

2. The pulse detonation system of claim 1, each said detonation passage comprising a first portion extending from said cylindrical member forward surface into a middle portion of said cylindrical member and a second portion extending from said first portion to said outer circumferential surface of said cylindrical member.

3. The pulse detonation system of claim 2, wherein said first portion of said detonation passages is substantially linear.

4. The pulse detonation system of claim 2, wherein said first portion of said detonation passages has a longitudinal axis extending therethrough substantially parallel to said longitudinal centerline axis.

5. The pulse detonation system of claim 2, wherein said second portion of said detonation passages is substantially linear.

6. The pulse detonation system of claim 2, wherein said second portion of said detonation passages is substantially non-linear.

7. The pulse detonation system of claim 2, wherein said second portion of said detonation passages has a longitudinal axis extending therethrough oriented at an angle to said longitudinal axis extending through said first portion of said detonation passages.

8. The pulse detonation system of claim 7, wherein said longitudinal axis extending through said second portion of said detonation passages is oriented substantially perpendicular to said longitudinal axis extending through said first portion of said detonation passages.

9. The pulse detonation system of claim 7, wherein said longitudinal axis extending through said second portion of said detonation passages is oriented at an obtuse angle to said longitudinal axis extending through said first portion of said detonation passages.

10. The pulse detonation system of claim 2, wherein said second portion of said detonation passages extends substantially tangentially to said outer circumferential surface of said cylindrical member.

11. The pulse detonation system of claim 1, wherein said detonation passages are symmetrically spaced within said cylindrical member.

12. The pulse detonation system of claim 1, wherein the number of said detonation passages in said cylindrical member is a function of a diameter for said cylindrical member and a length of each said detonation passage.

13. The pulse detonation system of claim 1, wherein said detonation passages are aligned with each said port in a predetermined timing and sequence.

14. The pulse detonation system of claim 1, wherein said detonation passages have a substantially constant diameter.

15. The pulse detonation system of claim 1, wherein said detonation passages have a substantially convergent diameter for at least a portion thereof.

16. The pulse detonation system of claim 2, wherein said first portions of said detonation passages are arranged in an annular configuration having a predetermined radius.

17. The pulse detonation system of claim 2, said cylindrical member further comprising a plurality of portions extending substantially tangentially from said outer circumferential surface.

18. The pulse detonation system of claim 17, wherein said second portion of said detonation passages extend through said extending portions of said cylindrical member.

19. The pulse detonation system of claim 1, each said group of ports in said stator further comprising an air port in flow communication with a source of compressed air.

20. The pulse detonation system of claim 19, wherein said air port is configured to extend annularly in said stator a predetermined amount.

21. The pulse detonation system of claim 1, each said group of ports in said stator further comprising a fuel port in flow communication with a fuel source.

22. The pulse detonation system of claim 21, further comprising a fuel manifold for supplying fuel to each said fuel port.

23. The pulse detonation system of claim 21, further comprising a device for controlling the injection of fuel into said detonation passages through said fuel ports.

24. The pulse detonation system of claim 1, each said group of ports in said stator further comprising a port having a device for initiating a detonation wave associated therewith.

25. The pulse detonation system of claim 24, further comprising a device for controlling the initiation of detonation waves in said detonation passages by said initiation devices.

26. The pulse detonation system of claim 1, further comprising a plurality of port groups provided in said stator, wherein a plurality of detonation cycles occur in a predetermined timing and sequence in each said detonation passage during a revolution of said cylindrical member.

27. The pulse detonation system of claim 26, said stator including a predetermined amount of circumferential space between each said port group.

28. The pulse detonation system of claim 1, said cylindrical member further comprising an additional stage of spaced detonation passages disposed therethrough.

29. The pulse detonation system of claim 28, said detonation passages of said additional stage being positioned radially interior to said first stage of detonation passages.

30. The pulse detonation system of claim 28, said detonation passages of said additional stage being positioned radially exterior to said first stage of detonation passages.

31. The pulse detonation system of claim 28, wherein said detonation passages of said additional detonation stage are substantially aligned circumferentially with said detonation passages of said first stage.

32. The pulse detonation system of claim 28, said stator further comprising a second group of ports formed therein alignable with said detonation passages of said additional detonation stage.

33. The pulse detonation system of claim 1, further comprising a plurality of seals positioned between said stator and said forward surface of said cylindrical member.

34. A method of providing power to a drive shaft in a gas turbine engine, comprising the following steps:
(a) providing a rotatable cylindrical member having a plurality of spaced detonation passages therein;
(b) providing a stator in spaced relation to a forward surface of said cylindrical member, said stator having at least one group of ports formed therein;
(c) connecting said cylindrical member to a drive shaft;
(d) performing a detonation cycle in each said detonation passage; and,
(e) producing a torque on said cylindrical member which causes said cylindrical member and said drive shaft to rotate.

35. The method of claim 34, said detonation cycle further comprising the steps of:
(a) supplying compressed air to said detonation passages;
(b) injecting fuel into said detonation passages;
(c) initiating a detonation wave in said detonation passages; and,
(d) exhausting products of combustion from said cylindrical member in a substantially tangential direction with respect to an outer circumferential surface thereof.

36. The method of claim 35, wherein said detonation wave is initiated at a predetermined point in said detonation passage.

37. The method of claim 35, wherein said detonation wave is initiated by a device igniting fuel and air in said detonation passage.

38. The method of claim 34, further comprising the step of causing said cylindrical member to rotate at a predetermined speed prior to injecting fuel into said detonation passages.

39. The method of claim 34, further comprising the step of aligning said detonation passages in a predetermined timing and sequence with an air port in said stator, a fuel port in circumferentially spaced relation to said air port, and a port having an initiation device associated therewith in circumferentially spaced relation to said fuel port.

40. A gas turbine engine, comprising:
(a) a fan section at a forward end of said gas turbine engine including at least a first fan blade row connected to a drive shaft;
(b) a booster compressor positioned downstream of said fan section, said booster compressor including a first compressor blade row and a second compressor blade row connected to said drive shaft and interdigitated with said first compressor blade row; and,
(c) a pulse detonation system for powering said drive shaft, said pulse detonation system further comprising:
(1) a rotatable cylindrical member having a forward surface, an aft surface, and an outer circumferential surface, said cylindrical member including at least one stage of detonation passages disposed therethrough, wherein said cylindrical member is connected to said drive shaft; and,
(2) a stator configured in spaced arrangement with said forward surface of said cylindrical member and a portion of said shaft, said stator including at least one group of ports formed therein alignable with said detonation passages as said cylindrical member rotates;
wherein detonation cycles are performed in said detonation passages so that combustion gases exit said cylindrical member in a substantially tangential direction with respect to said outer circumferential surface to create a torque which causes said cylindrical member to rotate and power said fan section and said booster compressor.

41. The gas turbine engine of claim 40, each said group of ports in said stator further comprising:
(a) an air port in flow communication with a source of compressed air;
(b) a fuel port in flow communication with a fuel source; and,
(c) a port having a device associated therewith for initiating a detonation in said detonation passages.

42. A gas turbine engine, comprising:
(a) a bellmouth at a forward end of said gas turbine engine;
(b) a compressor positioned downstream of and in flow communication with said bellmouth, said compressor including a first compressor blade row and a second blade row connected to a drive shaft and interdigitated with said first compressor blade row;
(c) a load connected to said drive shaft; and,
(d) a pulse detonation system for powering said drive shaft, said pulse detonation system further comprising:
(1) a rotatable cylindrical member having a forward surface, an aft surface, and an outer circumferential surface, said cylindrical member including at least one stage having a plurality of detonation passages disposed therethrough, wherein said cylindrical member is connected to said drive shaft; and,
(2) a stator configured in spaced arrangement to said forward surface of said cylindrical member and a portion of said shaft, said stator including at least one group of ports formed therein alignable with said detonation passages as said cylindrical member rotates;
wherein detonation cycles are performed in said detonation passages so that combustion gases exit said cylindrical member in a substantially tangential direction with respect to said outer circumferential surface to create a torque which causes said cylindrical member to rotate and power said compressor and said load.

43. The gas turbine engine of claim 42, each said group of ports in said stator further comprising:
(a) an air port in flow communication with a source of compressed air;
(b) a fuel port in flow communication with a fuel source; and,
(c) a port having a device associated therewith for initiating a detonation in said detonation passages.

* * * * *